United States Patent
Chen et al.

(10) Patent No.: US 11,274,039 B2
(45) Date of Patent: *Mar. 15, 2022

(54) PROCESS AND APPARATUS FOR PRODUCING A FEED STREAM FOR A STEAM REFORMING PLANT

(71) Applicant: L'Air Liquide, Societe Anonyme pour l'Etude et l'Exploitation des Procedes Georges Claude, Paris (FR)

(72) Inventors: Yue Chen, Shanghai (CN); Swatantra Kumar Shrivastava, Lich (DE); Mrityunjoy Samaddar, Frankfurt am Main (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 237 days.

This patent is subject to a terminal disclaimer.

(21) Appl. No.: 16/466,732

(22) PCT Filed: Nov. 17, 2017

(86) PCT No.: PCT/EP2017/025336
§ 371 (c)(1),
(2) Date: Jun. 5, 2019

(87) PCT Pub. No.: WO2018/103888
PCT Pub. Date: Jun. 14, 2018

(65) Prior Publication Data
US 2019/0300365 A1    Oct. 3, 2019

(30) Foreign Application Priority Data
Dec. 5, 2016 (EP) ..................... 16400056

(51) Int. Cl.
| | | |
|---|---|---|
| *C01B 3/38* | (2006.01) |
| *C10K 1/04* | (2006.01) |
| *C10K 3/04* | (2006.01) |

(52) U.S. Cl.
CPC .................. *C01B 3/38* (2013.01); *C10K 1/04* (2013.01); *C01B 2203/1205* (2013.01); *C01B 2203/1264* (2013.01); *C10K 3/04* (2013.01)

(58) Field of Classification Search
CPC .............. C01B 2203/1258; C01B 3/38; C01B 2203/065; C01B 2203/0822;
(Continued)

(56) References Cited

U.S. PATENT DOCUMENTS

| | | |
|---|---|---|
| 3,477,832 A | 11/1969 | Mayland et al. |
| 3,997,427 A * | 12/1976 | Eng ........................ B01J 23/881 |
| | | 208/67 |

(Continued)

FOREIGN PATENT DOCUMENTS

WO    WO 2011/016970    2/2011

OTHER PUBLICATIONS

International Search Report and Written Opinion for PCT/EP2017/025336, dated Dec. 20, 2017.

*Primary Examiner* — Imran Akram
(74) *Attorney, Agent, or Firm* — Justin K. Murray

(57) ABSTRACT

The invention relates to a process and an apparatus for producing an olefin-containing feed stream for a steam reforming plant. According to certain embodiments of the invention, the olefin-containing hydrocarbon starting material is for this purpose vaporized and catalytically hydrogenated. The hydrogenation product stream obtained is separated into a gaseous reforming feed stream, which is fed to a steam reforming plant, and a gaseous recycle stream. As a result of the cooling according to the invention of the (Continued)

gaseous recycle stream down to at least partial condensation thereof and the separate recirculation of the gaseous partial recycle stream and of the liquid partial recycle stream, the procurement of a large and complicated circulation compressor is avoided and electric energy for operating this compressor is saved.

16 Claims, 2 Drawing Sheets

(58) Field of Classification Search
CPC .... C01B 2203/0827; C01B 2203/1264; C01B 2203/148
See application file for complete search history.

(56) References Cited

U.S. PATENT DOCUMENTS

| | | |
|---|---|---|
| 6,114,400 A * | 9/2000 | Nataraj ............... C01B 3/36 518/715 |
| 7,037,485 B1 | 5/2006 | Drnevich |
| 8,080,070 B2 | 12/2011 | Grover |
| 8,877,155 B1 * | 11/2014 | Grover ............... B01D 53/047 423/650 |
| 2008/0237090 A1 | 10/2008 | Musich et al. |
| 2009/0265988 A1 * | 10/2009 | Grover ............... C01B 3/384 48/199 R |
| 2010/0228062 A1 * | 9/2010 | Babicki ............... C10B 53/02 585/240 |
| 2011/0085967 A1 * | 4/2011 | Raybold ............... C01B 3/382 423/652 |
| 2011/0112345 A1 * | 5/2011 | Chewter ............... C07C 1/20 585/302 |
| 2011/0263916 A1 * | 10/2011 | Bao ............... C01B 3/38 585/254 |
| 2012/0288412 A1 * | 11/2012 | Vincitore ............... C10G 3/42 422/111 |
| 2014/0066673 A1 * | 3/2014 | Yanagawa ............... C07C 4/06 585/256 |
| 2016/0244555 A1 * | 8/2016 | Bernardi ............... B01J 23/42 |
| 2017/0057890 A1 * | 3/2017 | Kawai ............... C07C 5/10 |
| 2019/0233350 A1 * | 8/2019 | San ............... C07C 11/04 |

* cited by examiner

PROCESS AND APPARATUS FOR PRODUCING A FEED STREAM FOR A STEAM REFORMING PLANT

CROSS REFERENCE TO RELATED APPLICATIONS

This application is a § 371 of International PCT Application PCT/EP2017/025336, filed Nov. 17, 2017, which claims the benefit of EP16400056.4, filed Dec. 5, 2016, both of which are herein incorporated by reference in their entireties.

FIELD OF THE INVENTION

The present invention relates to a process for producing a feed stream for a steam reforming plant, in which a hydrocarbon input stream containing olefins is used. The invention further relates to an apparatus for carrying out such a process.

BACKGROUND

Hydrocarbons can be catalytically converted by means of steam into synthesis gas, i.e. mixtures of hydrogen ($H_2$) and carbon monoxide (CO). As indicated in Ullmann's Encyclopaedia of Industrial Chemistry, Sixth Edition, 1998 Electronic Release, keyword "gas production", this steam reforming is the most widely used method for the production of synthesis gas, which can subsequently be converted into further important basis chemicals such as methanol or ammonia.

The steam reforming of natural gas proceeds strongly endothermically. It is therefore carried out in a reformer furnace in which numerous, catalyst-containing reformer tubes in which the steam reforming reaction proceeds are arranged in parallel. The reformer tubes are usually fired by means of burners which are installed on the upper side or underside or on the side walls in the interior of the reformer furnace and directly fire the intermediate space between the reformer tubes. After preheating by means of heat exchangers or fired heaters, the hydrocarbon/steam mixture after final heating enters the reformer tubes and is reacted there over the reforming catalyst to form carbon monoxide and hydrogen. The composition of the product gas is determined by the reaction equilibrium; the product gas therefore contains not only carbon monoxide and hydrogen but also carbon dioxide, unreacted methane and water vapour.

To effect energy optimization and/or in the case of starting materials comprising higher hydrocarbons, a prereformer for preliminary cracking of the starting material can be used downstream of the preheater. The precracked starting material is then heated in a further heater to the desired entry temperature into the main reformer, for example the steam reformer. Conventional prereforming can be defined as a steam reforming process at limited temperatures (significantly below 700° C.). It leads to a gaseous intermediate whose main constituents are methane and steam. The intermediate does not contain any, or only small proportions of, higher hydrocarbons. This intermediate is normally treated further in a steam reformer, referred to as main reformer.

As stated in Ullmann's Encyclopaedia of Industrial Chemistry, ibid., catalysts based on nickel are normally used for steam reforming. These catalysts are sensitive to catalyst poisons such as sulfur, arsenic, copper, vanadium, lead and chlorine or halogens in general. Sulfur in particular significantly reduces the catalyst activity and can be found in virtually all starting materials which come into question as feed for steam reforming. For this reason, these constituents have to be removed from the feed stream by suitable measures before the feed stream is introduced into the steam reforming plant. Preference is given today to desulfurization systems in which the removal of sulfur compounds takes place over zinc oxide as sorbent at temperatures of from 350 to 400° C. These desulfurization systems based on zinc oxide are very reliable in the absorption of hydrogen sulfide and, with restrictions, sulfur compounds such as carbonyl sulfide and mercaptans. The latter are often hydrogenated by means of hydrogen over suitable catalysts to form hydrogen sulfide (hydrodesulfurization, HDS).

Although the use of methane-containing natural gas as starting material or feed predominates in steam reforming, other hydrocarbons such as naphtha, liquefied petroleum gas or refinery gases are also used, depending on local availability. Thus, the US patent specification U.S. Pat. No. 3,477,832 describes a process for producing a synthesis gas by catalytic steam reforming of naphtha and similar hydrocarbons. For the purposes of the present patent application, the term naphtha refers to hydrocarbons having an average number of carbon atoms of seven, which contain linear and branched hydrocarbons, a certain proportion of aromatic and olefinic hydrocarbons and various impurities, for example sulfur components. In order to convert this mixture which is liquid under ambient conditions into a feed stream for steam reforming, it is vaporized and heated; the temperature here should ideally be in the range from 260 to 316° C. but in no event is allowed to exceed 343° C. since decomposition of components present in the feed otherwise occurs, forming undesirable carbon deposits in the steam reforming plant and in plant components upstream thereof. The heated and vaporized mixture is subsequently hydrogenated over a fixed bed of a hydrogenation catalyst based on Co—Mo, with the hydrogenation optionally occurring in a number of stages. The vaporized and hydrogenated naphtha is subsequently fed to the steam reforming reactor.

Difficulties result from the highly exothermic nature of the hydrogenation reaction, which can lead to formation of zones having a high temperature in the catalyst bed, known as "hot spots". The latter can in turn lead to undesirable cracking reactions of unsaturated components in the starting material and/or premature catalyst deactivation. To control the temperature regime in the hydrogenation reactor reliably, part of the hydrogenation reactor product is often recirculated to the reactor inlet in order to dilute the unsaturated compounds present in the starting material. A disadvantage here is that large amounts of the gaseous hydrogenation reactor product often have to be compressed and recirculated to the reactor inlet of the hydrogenation reactor in order to achieve the desired dilution effect, which is achieved by means of correspondingly large and thus expensive compressors.

SUMMARY OF THE INVENTION

It is therefore an object of the present invention to provide a process and an apparatus for producing a feed stream for a steam reforming plant from an olefin-containing starting material, which does not suffer from the above-described disadvantages of the prior art. In particular, the process and the apparatus should ensure reliable vaporization of the liquid hydrocarbon starting material and the subsequent hydrogenation of the unsaturated compounds present therein, with overheating, leading to cracking reactions of the olefins present, being avoided.

A FIRST OF THE INVENTION

Process for producing a feed stream for a steam reforming plant containing at least one reforming stage, comprising the following steps:

(a) provision of a first liquid input stream containing olefins and a second input stream comprising hydrogen, (b) combining of the first input stream and the second input stream to form a hydrogenation input stream, (c) heating of the hydrogenation input stream in a heating apparatus and vaporization of the hydrogenation input stream in a vaporization apparatus, (d) introduction of the heated and vaporized hydrogenation input stream into a hydrogenation reactor comprising at least one hydrogenation zone, at least partial conversion of the olefins present in the hydrogenation input stream in the hydrogenation reactor under olefin hydrogenation conditions, discharge of a gaseous olefin hydrogenation product stream from the hydrogenation reactor, (e) separation of the olefin hydrogenation product stream in a separation apparatus into a gaseous reforming feed stream which is fed into a steam reforming plant and a gaseous recycle stream, (f) cooling of the gaseous recycle stream, with this being at least partially condensed and subsequently introduced into a phase separation apparatus in which it is separated into a gaseous partial recycle stream and a liquid partial recycle stream, (g) discharge of the gaseous partial recycle stream and the liquid partial recycle stream from the phase separation apparatus, with the gaseous partial recycle stream being combined with the second input stream and the liquid partial recycle stream being combined with the first input stream and/or being recirculated to process step (b).

A SECOND EMBODIMENT OF THE INVENTION

Apparatus for producing a feed stream for a steam reforming plant containing at least one reforming stage, comprising the following constituents which are in fluid communication with one another:

(a) means for providing a first liquid input stream containing olefins and a second input stream comprising hydrogen, (b) means for combining the first input stream and the second input stream to form a hydrogenation input stream, (c) a heating apparatus for heating the hydrogenation input stream, and a vaporization apparatus for vaporizing the hydrogenation input stream, (d) a hydrogenation reactor comprising at least one hydrogenation zone, and means for introducing the heated and vaporized hydrogenation input stream into the hydrogenation reactor, and means for discharging a gaseous olefin hydrogenation product stream from the hydrogenation reactor, (e) a separation apparatus for separating the olefin hydrogenation product stream into a gaseous reforming feed stream and a gaseous recycle stream, and means for introducing the gaseous reforming feed stream into a steam reforming plant, (f) means for cooling and at least partially condensing the gaseous recycle stream, means for introducing the at least partially condensed, gaseous recycle stream into a phase separation apparatus, a phase separation apparatus suitable for separating the at least partially condensed, gaseous recycle stream into a gaseous partial recycle stream and a liquid partial recycle stream, (g) means for discharging the gaseous partial recycle stream and the liquid partial recycle stream from the phase separation apparatus, means for combining the gaseous partial recycle stream with the second input stream, means for combining the liquid partial recycle stream with the first input stream and/or means for recirculating the liquid partial recycle stream to the apparatus constituent (b).

For the purposes of the present invention, fluid communication between two regions of the apparatus of the invention refers to any type of connection which makes it possible for a fluid, for example a gas stream, to flow from one of the two regions to the other, regardless of any regions or components connected in between.

For the purposes of the invention, higher hydrocarbons are all hydrocarbons having more than one carbon atom in the molecule.

The reaction conditions required for reaction of the olefins in the hydrogenation reactor, namely the olefin hydrogenation conditions, are known to a person skilled in the art from the prior art, for example the documents mentioned at the outset. Necessary adaptations of these conditions to the respective operational requirements will be carried out by such a person on the basis of routine tests.

The invention is based on the recognition that it is advantageous to recirculate part of the hydrogenation reactor product in nongaseous form to the inlet of the hydrogenation reactor in order to achieve the desired dilution effect. Instead, it is proposed that the proportion of the olefin hydrogenation product stream which has been separated off from the gaseous reforming feed stream in the separation apparatus be cooled and at least partially condensed. The liquid partial recycle stream obtained here can be conveyed by means of simple liquid pumps and, for example, combined with the first, liquid input stream. The gaseous partial recycle stream obtained here can, owing to its small size, be conveyed and compressed by means of a separate, small compressor, or else the compressor which is in any case required for compression of the second, hydrogen-containing input stream can optionally also be utilized for conveying and compressing the gaseous partial recycle stream. In this way, a large and costly compressor for the recirculated proportion of the hydrogenation reactor product is saved.

It is also advantageous that the heat of condensation liberated in the at least partial condensation of the proportion of the olefin hydrogenation product stream which has been separated off can be transferred by indirect heat exchange to, for example, the first liquid input stream and thus contributes to heating of the latter before vaporization. This increases the energy efficiency of the process.

Preferred Embodiments of the Invention

In a preferred embodiment of the process of the invention, the gaseous partial recycle stream is combined with the second input stream and compressed together with the latter or the gaseous partial recycle stream is combined with the previously compressed, second input stream. In this way, it is possible to achieve recirculation of the gaseous partial recycle stream without a separate compressor being required for this purpose. The existing hydrogen compressor can often also be used for this purpose.

A further preferred embodiment of the process of the invention is characterized in that the heating apparatus in process step (c) is configured as a heat exchanger in which the hydrogenation input stream is heated by indirect heat exchange with a hot crude synthesis gas product stream from the steam reforming plant, with a hot flue gas stream from the reformer furnace, with a hot product gas stream from the CO conversion plant installed downstream of the steam reforming plant (CO shift) or with a plurality of these hot gas streams. As a result of this measure, the heat content of the process streams mentioned is utilized for heating the first input stream and the energy efficiency of the overall process is thus improved.

In a further aspect of the process of the invention, an at least partial conversion of organic sulfur compounds present in the first input stream also occurs in the hydrogenation reactor under conditions of hydrodesulfurization (HDS) to give desulfurized hydrocarbons and hydrogen sulfide, with the hydrogen sulfide formed being separated off from the reforming feed stream before the latter is fed to the steam reforming plant. The conditions of the hydrogenation of unsaturated compounds and of hydrodesulfurization are so similar to one another that the two process steps can be carried out in the same reactor, should desulfurization of the organic input stream be necessary.

In a further embodiment of the process of the invention, the cooling in process step (f) is carried out in a number of stages, with at least one cooling stage being configured as a heat exchanger in which cooling of the gaseous recycle stream occurs by indirect heat exchange with the first input stream introduced into the process or the hydrogenation input stream. Apart from cooling of the gaseous recycle stream, preheating of the first input stream or of the hydrogenation input stream can be achieved in this way. This improves the thermal management of the process.

In the abovementioned embodiment of the process of the invention, particular preference is given to at least one further cooling stage in which cooling of the gaseous recycle stream occurs by indirect heat exchange with a cooling medium, in particular cooling water, being present. In this way, greater flexibility in respect of the cooling action to be achieved is obtained.

It is particularly advantageous for the gaseous recycle stream to be cooled in process step (f) to such an extent that at least half of it is condensed, so that at least 50 mol % of the recycle stream, preferably at least 70 mol % of the recycle stream, is present in liquid form. In this way, a gaseous partial recycle stream which is so small that it can be fed to the compressor for the second input stream without the compressor having to be enlarged is obtained.

In a particular embodiment of the process of the invention, the steam reforming plant comprises a prereforming stage (prereformer) in which higher hydrocarbons are at least partly converted under prereforming conditions into methane. This embodiment is advantageous since the olefins present in the feed stream are hydrogenated to the corresponding alkanes which can then be prereacted in a targeted manner to form methane in the prereforming stage before the mixed feed stream arrives in the main reforming stage.

In a particular embodiment of the apparatus of the invention, this further comprises a compressor suitable for compressing the second input stream or the second input stream combined with the gaseous partial recycle stream. The existing hydrogen compressor can often also be utilized for this purpose.

A further preferred embodiment of the apparatus of the invention is characterized in that the heating apparatus in apparatus constituent (c) is configured as a heat exchanger suitable for heating the hydrogenation input stream by indirect heat exchange with a hot crude synthesis gas product stream from the steam reforming plant, with a hot flue gas stream from the reformer furnace, with a hot product gas stream from the CO conversion plant located downstream of the stream reforming plant (CO shift) or with a plurality of these hot gas streams. As a result of this measure, the heat content of the process streams mentioned is utilized for heating the first input stream and the energy efficiency of the overall process is thus improved.

In a further aspect, the hydrogenation reactor in the apparatus of the invention is also suitable for at least partial conversion of organic sulfur compounds present in the first input stream under conditions of hydrodesulfurization (HDS) to give desulfurized hydrocarbons and hydrogen sulfide, with means for separating the hydrogen sulfide formed from the reforming feed stream before the latter is fed to the steam reforming plant also being present. The conditions of hydrogenation of unsaturated compounds and hydrodesulfurization are so similar to one another that the two process steps can be carried out in the same reactor, should desulfurization of the organic starting material be necessary.

In a further embodiment of the apparatus of the invention, the cooling apparatus in apparatus constituent (f) is configured with a number of stages, with at least one cooling stage being configured as a heat exchanger which is suitable for cooling the gaseous recycle stream by indirect heat exchange with the first input stream introduced into the process or the hydrogenation input stream. Apart from cooling of the gaseous recycle stream, preheating of the first input stream or of the hydrogenation input stream can be achieved in this way. This improves the thermal management of the process.

In the abovementioned embodiment of the apparatus of the invention, particular preference is given to a further cooling stage which is suitable for cooling the gaseous recycle stream by indirect heat exchange with a cooling medium, in particular cooling water, being present. In this way, greater flexibility in respect of the cooling action to be achieved is obtained.

In a particular embodiment of the apparatus of the invention, the steam reforming plant further comprises a prereforming stage (prereformer) which is suitable for at least partial conversion of the higher hydrocarbons into methane under prereforming conditions. This embodiment is advantageous since the olefins present in the feed stream are hydrogenated to the corresponding alkanes which can then be prereacted in a targeted manner in the prereforming stage to give methane before the mixed feed stream arrives in the main reforming stage.

BRIEF DESCRIPTION OF THE DRAWINGS

Further features, advantages and possible uses of the invention can also be derived from the following description of working examples and numerical examples and the drawings. Here, all features described and/or depicted form, in themselves or in any combination, the subject matter of the invention, regardless of the way in which they are summarized in the claims or their back references.

The figures show.

DETAILED DESCRIPTION OF THE INVENTION

Figure 1:
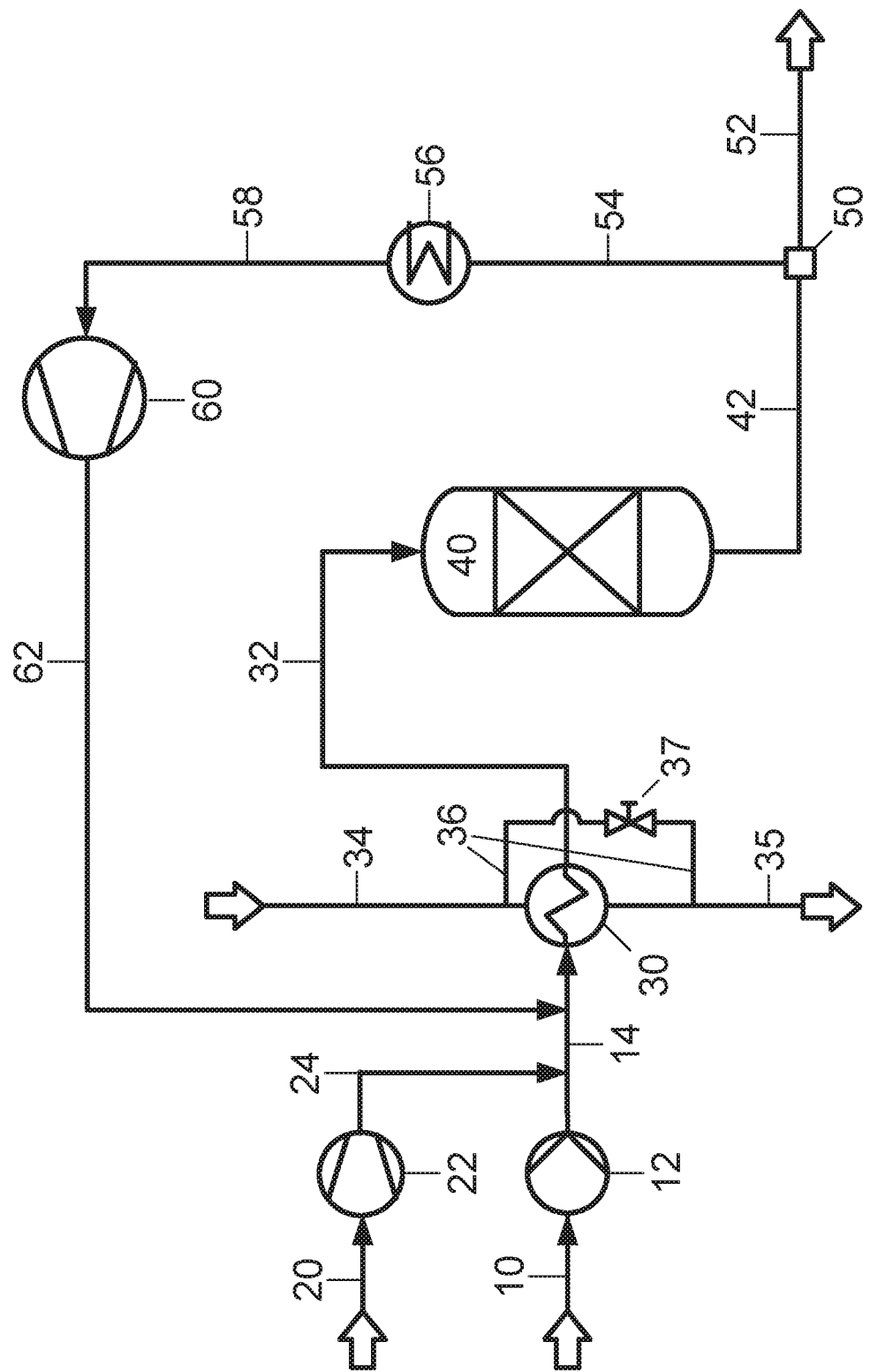
FIG. 1 a process for producing a feed stream for a steam reforming plant according to the prior art, FIG. 2 a schematic depiction of the process of the invention as per a preferred embodiment.

FIG. 1 schematically depicts a process according to the prior art for producing a feed stream for a steam reforming plant from an olefin-containing hydrocarbon input stream as block flow diagram.

The first input stream, an olefin-containing, liquid hydrocarbon mixture, is provided via conduit 10 and pump 12 and conveyed via conduit 14 to the heat exchanger 30. A second input stream, a hydrogen-containing gas stream, is provided via conduit 20 and compressor 22 and conveyed via conduits 24 and 14 likewise to the heat exchanger 30. The combining of the first and second input streams thus gives a hydrogenation input stream which is heated and vaporized in the heat exchanger 30 and fed via conduit 32 to the hydrogenation reactor 40. As an alternative, the second, hydrogen-containing input stream can also be added after vaporization of the first input stream in order to form the hydrogenation input stream; in this case, an additional heating apparatus for setting the desired entry temperature into the hydrogenation reactor is optionally provided. As shown in FIG. 1, the resulting hydrogenation input stream is heated in the heat exchanger 30 by indirect heat exchange with the hot product gas stream from the CO conversion plant located downstream of the steam reforming plant (CO shift), which hot product gas stream is fed via conduit 34 to the heat exchanger 30.

In order to limit the temperature rise on heating of the hydrogenation input stream in the heat exchanger 30, the latter is equipped with a bypass, conduit 36, and a regulating valve 37 arranged in the conduit 36. The cooled product gas stream from the CO conversion plant is discharged via conduit 35 from the process.

In the hydrogenation reactor 40, the olefins present in the hydrogenation input stream and any proportions of diolefins still present are hydrogenated to give an olefin hydrogenation product stream containing paraffins. Furthermore, organic sulfur components can also be hydrogenated to give the corresponding hydrocarbons and hydrogen sulfide. In the latter case, the hydrogen sulfide produced has to be removed by means of suitable measures, for example by use of adsorbents based on zinc oxide, before the olefin hydrogenation product stream is introduced into the steam reforming plant. The catalysts required for the combined hydrogenation of monoolefins and diolefins and also the organic sulfur components, for example catalysts based on Co—Mo or Ni—Mo, are commercially available. As an alternative, the hydrogenation of the diolefins and also the organic sulfur components can be carried out in separate hydrogenation reactors in order to configure the hydrogenation conditions optimally for each starting material. Preference is particularly frequently given to hydrogenating the diolefins in a separate hydrogenation reactor at lower hydrogenation temperatures in order to prevent polymerization and deposition of the resulting polymer in the olefin hydrogenation reactor. The hydrogenation conditions to be selected for all these hydrogenation variants are known to those skilled in the art. The above-described modifications having a separate hydrogenation reactor for the diolefins and organic sulfur components are not shown in the figures; however, they are known per se to those skilled in the art.

Via conduit 42, the olefin hydrogenation product stream obtained is discharged from the hydrogenation reactor 40 and fed to the separation apparatus 50. This can be realized in a simple manner by means of regulating valves which are arranged in the path of the conduits 52 and 54. A gaseous reforming feed stream is discharged from the separation apparatus via conduit 52 and fed to the steam reforming plant. Furthermore, a gaseous recycle stream is discharged via line 54 from the separation apparatus and fed to a cooling apparatus 56. The cooling apparatus 56 can, for example, be configured as a heat exchanger in which cooling of the gaseous recycle stream is effected against a suitable cooling medium, for example cooling water. The task of the cooling apparatus is to remove the heat liberated by the exothermic hydrogenation from the gaseous recycle stream and cool the latter to such an extent that it can again be introduced into the hydrogenation input stream, thus avoiding overheating of the hydrogenation reactor 40. However, this recycle stream remains in the gaseous state.

The now cooled, gaseous recycle stream is fed via conduit 58 to the circulation compressor 60 and compressed therein. The compressed, gaseous recycle stream goes via conduit 62 and conduit 14 back into the heat exchanger 30, after which it is combined with the first input stream and the second input stream and thus becomes a constituent of the hydrogenation input stream.

In the schematic depiction of the process of the invention and of the apparatus of the invention shown in FIG. 2, the course of the process up to reference numeral 54 corresponds, in a preferred embodiment, to the process sequence set forth in connection with FIG. 1, with reference numerals having the same numbering also having the same meaning as in FIG. 1.

Supplementary to the process sequence indicated in FIG. 1, the hydrogenation input stream formed by combining of the first input stream and the second input stream is conveyed via conduit 14 to the heat exchanger 70 and preheated there by indirect heat exchange with the gaseous recycle stream which is discharged via conduit 54 from the separation apparatus 50 and fed to the heat exchanger 70. The preheated hydrogenation input stream is then conveyed via conduit 16 to the heat exchanger 30 and heated and vaporized there.

The cooled, gaseous recycle stream discharged from the heat exchanger 70 is conveyed via conduit 72 to the cooling apparatus 80. The cooling apparatus 80 can, for example, be configured as a heat exchanger in which the cooling of the gaseous recycle stream is effected against a suitable cooling medium, for example cooling water. The task of the heat exchanger 70 and the cooling apparatus 80 is to remove the heat liberated by the exothermic hydrogenation from the gaseous recycle stream and cool the latter to such an extent that at least partial condensation occurs. The partially condensed stream is discharged via the conduit 82 from the cooling apparatus 80, introduced into the phase separation apparatus 90 and separated in the latter into a gaseous partial recycle stream and a liquid partial recycle stream. The gaseous partial recycle stream, which also contains part of the hydrogen which has not been reacted in the hydrogenation, is discharged from the phase separation apparatus via conduit 92 and combined with the second input stream flowing through conduit 20.

The liquid partial recycle stream discharged from the phase separation apparatus via conduit 94 is combined via pump 96 and conduit 98 with the hydrogenation input stream which is supplied via conduit 14. As an alternative, the liquid partial recycle stream can also be combined with the first input stream flowing through conduit 10, as a result of which the pump 96 is saved.

Figure 2:
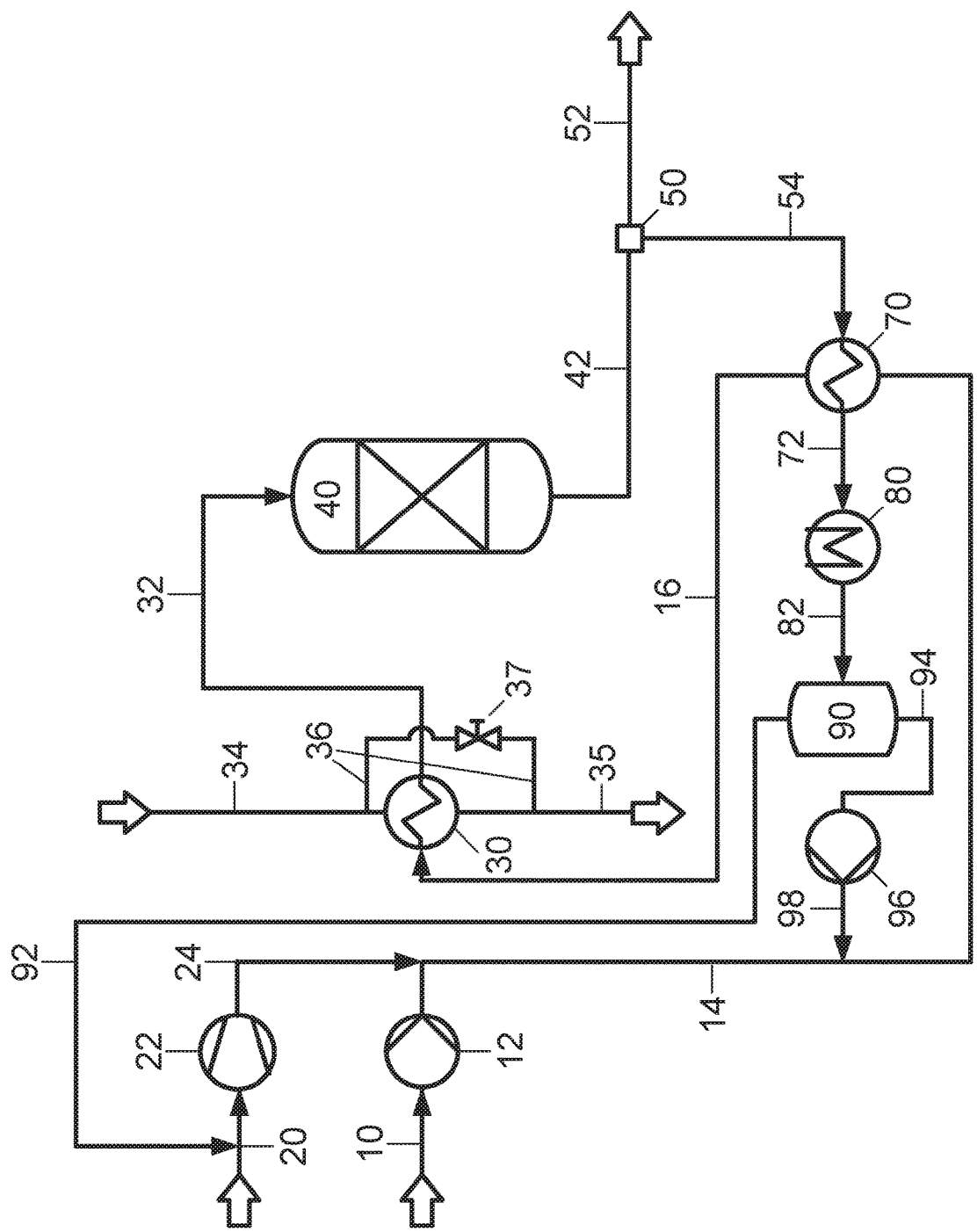

An advantage of the configuration of the invention described in FIG. 2 is that, compared to the process sequence known from the prior art and illustrated in FIG. 1, the circulation compressor 60 is saved. This saving effect is significant because, owing to the large amounts of gas or vapour to be recirculated and owing to the temperature level of the gases or vapours to be compressed, the compressor is an apparatus having a complicated, possibly multistage configuration and large size.

Numerical Examples

In the following numerical examples, the mode of action of the invention is illustrated with the aid of the results of simulation calculations. The case of production of a feed for a steam reforming plant having a hydrogen capacity of 130 000 standard m$^3$/h, with a liquefied petroleum gas mixture (LPG) having an olefin content of 50 mol % serving as hydrocarbon starting material, is examined.

Comparative Example

In the production of a feed stream for a steam reforming plant according to the prior art (FIG. 1), the circulation compressor 60 used requires an electric power of 165 kW. The external cooling power which has to be applied to the cooling apparatus 56 in order to bring the entry temperature of the gaseous recycle stream to a suitable temperature level is 4.2 GJ/h. The cooling water consumption for cooling of the circulation compressor 60 is 60 m$^3$/h.

Invention

In the production of a feed stream for a steam reforming plant according to the invention (FIG. 2), the circulation compressor 60 is dispensed with, as a result of which capital costs are saved. On the other hand, a pump 96 is required, but this is significantly cheaper because of its small size and simpler construction and can optionally even be omitted, c.f. what has been said above with regard to FIG. 2. The existing compressor 22 is also utilized for the gaseous partial recycle stream, so that no separate capital costs are incurred here. The electric power required in this mode of operation is 20 kW, so that 145 kW of electric power are saved compared to the comparative example. On the other hand, the external cooling power which has to be applied in the cooling apparatus 80 in order to bring the temperature of the gaseous recycle stream to a suitable temperature level for the partial condensation is about 9.50 GJ/h, so that about 5.32 GJ/h of additional external cooling power are required according to the invention than in the case of the mode of operation according to the prior art. However, particularly in integrated sites, cooling media such as cooling water are often available at low cost, so that the saving in respect of the electric power required in combination with the omission of the circulation compressor predominates.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention provides a process and an apparatus for producing an olefin-containing feed stream for a steam reforming plant. As a result of the cooling according to the invention of the gaseous recycle stream down to at least partial condensation thereof and the separate recirculation of the gaseous partial recycle stream and the liquid partial recycle stream, the procurement of a large and complicated circulation compressor is avoided and electric energy for operating this compressor is saved.

LIST OF REFERENCE NUMERALS

10 Conduit
12 Pump
14 Conduit
20 Conduit
22 Compressor
24 Conduit
30 Heat exchanger
32 Conduit
34 Conduit
35 Conduit
36 Conduit
37 Regulating valve
40 Hydrogenation reactor
42 Conduit
50 Separation apparatus
52 Conduit
54 Conduit
56 Cooling apparatus
58 Conduit
60 Circulation compressor
62 Conduit
70 Heat exchanger
72 Heat exchanger
80 Cooling apparatus
85 Conduit
90 Phase separation apparatus 92 Conduit
94 Conduit
96 Pump
98 Conduit

The invention claimed is:

1. A process for producing a feed stream for a steam reforming plant containing at least one reforming stage, the process comprising the following steps:
   (a) providing a first liquid input stream containing olefins and a second input stream comprising hydrogen;
   (b) combining of the first input stream and the second input stream to form a hydrogenation input stream;
   (c) heating of the hydrogenation input stream in a heating apparatus and vaporizing the hydrogenation input stream in a vaporization apparatus, thereby forming a heated and vaporized hydrogenation input stream;
   (d) introducing the heated and vaporized hydrogenation input stream into a hydrogenation reactor comprising at least one hydrogenation zone, at least partially converting the olefins present in the heated and vaporized hydrogenation input stream in the hydrogenation reactor under olefin hydrogenation conditions, and then discharging a gaseous olefin hydrogenation product stream from the hydrogenation reactor;
   (e) separating the gaseous olefin hydrogenation product stream in a separation apparatus into a gaseous reforming feed stream which is fed into a steam reforming plant and a gaseous recycle stream;
   (f) cooling of the gaseous recycle stream, with this being at least partially condensed and subsequently introduced into a phase separation apparatus in which it is separated into a gaseous partial recycle stream and a liquid partial recycle stream; and
   (g) discharging the gaseous partial recycle stream and the liquid partial recycle stream from the phase separation apparatus, with the gaseous partial recycle stream being combined with the second input stream and the liquid partial recycle stream being combined with the first input stream and/or being combined with the hydrogenation input stream.

2. The process according to claim 1, wherein the gaseous partial recycle stream is combined with the second input stream (i) subsequent step (a) and before step (b), or (ii) subsequent step (b) and before step (c).

3. The process according to claim 1, wherein the heating apparatus in process step (c) is configured as a heat exchanger in which the hydrogenation input stream is heated by indirect heat exchange with a hot gas stream selected from the group consisting of a hot crude synthesis gas product stream from the steam reforming plant, a hot flue gas stream from a reformer furnace, a hot product gas stream from a CO conversion plant (CO shift) located downstream of the steam reforming plant, and combinations thereof.

4. The process according to claim 1, wherein an at least partial conversion of organic sulfur compounds present in the first input stream also occurs in the hydrogenation reactor under conditions of hydrodesulfurization (HDS) to give desulfurized hydrocarbons and hydrogen sulfide, with the hydrogen sulfide formed being separated off from the reforming feed stream before the reforming feed stream is fed to the steam reforming plant.

5. The process according to claim 1, wherein the cooling in process step (f) is effected in a number of stages, with at least one cooling stage being configured as a heat exchanger in which cooling of the gaseous recycle stream occurs by indirect heat exchange with the first input stream introduced into the process or the hydrogenation input stream.

6. The process according to claim 5, wherein at least one further cooling stage in which cooling of the gaseous recycle stream occurs by indirect heat exchange with a cooling medium, in particular cooling water, is present.

7. The process according to claim 1, wherein the gaseous recycle stream is cooled to such an extent that at least half of it is condensed, so that at least 50 mol % of the recycle stream is present in liquid form.

8. The process according to claim 1, wherein the gaseous recycle stream is cooled to such an extent that at least half of it is condensed, so that at least 70 mol % of the recycle stream is present in liquid form.

9. The process according to claim 1, wherein the steam reforming plant comprises a prereforming stage in which higher hydrocarbons are at least partly converted into methane under prereforming conditions.

10. An apparatus for producing a feed stream for a steam reforming plant containing at least one reforming stage, comprising the following constituents which are in fluid communication with one another:
    (a) means for providing a first liquid input stream containing olefins and a second input stream comprising hydrogen;
    (b) means for combining the first input stream and the second input stream to form a hydrogenation input stream;
    (c) a heating apparatus for heating the hydrogenation input stream, and a vaporization apparatus for vaporizing the hydrogenation input stream, thereby forming a heated and vaporized hydrogenation input stream;
    (d) a hydrogenation reactor comprising at least one hydrogenation zone, and means for introducing the heated and vaporized hydrogenation input stream into the hydrogenation reactor, and means for discharging a gaseous olefin hydrogenation product stream from the hydrogenation reactor;
    (e) a separation apparatus for separating the gaseous olefin hydrogenation product stream into a gaseous reforming feed stream and a gaseous recycle stream, and means for introducing the gaseous reforming feed stream into a steam reforming plant;
    (f) means for cooling and at least partially condensing the gaseous recycle stream, means for introducing the at least partially condensed, gaseous recycle stream into a phase separation apparatus, a phase separation apparatus suitable for separating the at least partially condensed, gaseous recycle stream into a gaseous partial recycle stream and a liquid partial recycle stream; and
    (g) means for discharging the gaseous partial recycle stream and the liquid partial recycle stream from the phase separation apparatus, means for combining the gaseous partial recycle stream with the second input stream, means for combining the liquid partial recycle stream with the first input stream and/or means for combining the liquid partial recycle stream with the hydrogenation input stream.

11. The apparatus according to claim 10, further comprising a compressor suitable for compressing the second input stream or the second input stream combined with the gaseous partial recycle stream.

12. The apparatus according to claim 10, wherein the heating apparatus in apparatus constituent (c) is configured as a heat exchanger suitable for heating the hydrogenation input stream by indirect heat exchange with a hot gas stream selected from the group consisting of a hot crude synthesis gas product stream from the steam reforming plant, a hot flue gas stream from the reformer furnace, a hot product gas stream from the CO conversion plant (CO shift) located downstream of the steam reforming plant and combinations thereof.

13. The apparatus according to claim 10, wherein the hydrogenation reactor is also suitable for at least partial conversion of organic sulfur compounds present in the first input stream under conditions of hydrodesulfurization (HDS) into desulfurized hydrocarbons and hydrogen sulfide, with means for separating the resulting hydrogen sulfide from the reforming feed stream before the reforming feed stream is fed to the steam reforming plant also being present.

14. The apparatus according to claim 10, wherein the cooling apparatus in apparatus constituent (f) is configured with a number of stages, with at least one cooling stage being configured as a heat exchanger suitable for cooling the gaseous recycle stream by indirect heat exchange with the first input stream introduced into the process or the hydrogenation input stream.

15. The apparatus according to claim 14, wherein at least one further cooling stage suitable for cooling the gaseous recycle stream by indirect heat exchange with a cooling medium, in particular cooling water, is present.

16. The apparatus according to claim 10, wherein the steam reforming plant comprises a preforming stage suitable for at least partial conversion of the higher hydrocarbons into methane under prereforming conditions.

* * * * *